US006481681B1

(12) United States Patent
Stunkel et al.

(10) Patent No.: US 6,481,681 B1
(45) Date of Patent: Nov. 19, 2002

(54) CLIP APPARATUS FOR A LAPTOP COMPUTER

(75) Inventors: Kathleen A. Stunkel, Algonquin, IL (US); Kevin J. Schechtel, Algonquin, IL (US); William L. Bollig, Elk Grove, IL (US)

(73) Assignee: 3Com Corporation, Rolling Meadows, IL (US)

( * ) Notice: Subject to any disclaimer, the term of this patent is extended or adjusted under 35 U.S.C. 154(b) by 28 days.

(21) Appl. No.: 09/650,540

(22) Filed: Aug. 30, 2000

(51) Int. Cl.[7] ............................. A47B 46/06; F04G 5/06
(52) U.S. Cl. .......................... 248/231.31; 248/187.1; 248/229.11; 248/918
(58) Field of Search ............................ 248/918, 187.1, 248/181.1, 229.11, 231.31, 316.2, 220.21, 220.22, 221.11, 222.13, 292.12, 292.14, 178.1

(56) References Cited

U.S. PATENT DOCUMENTS

| | | | | | |
|---|---|---|---|---|---|
| 2,532,209 | A | * | 11/1950 | Wallace | 248/229.11 |
| 2,584,955 | A | * | 2/1952 | Williams | 248/231.31 |
| 3,091,421 | A | * | 5/1963 | Wolbers | 248/229.11 |
| 5,322,255 | A | * | 6/1994 | Garrett | 248/918 |
| 5,619,395 | A | * | 4/1997 | McBride | 361/683 |
| 5,768,163 | A | * | 6/1998 | Smith, II | 364/705.01 |
| 5,855,343 | A | * | 1/1999 | Krekelberg | 248/121 |
| 6,239,841 | B1 | * | 5/2001 | Verstockt et al. | 348/373 |
| 6,323,902 | B1 | * | 11/2001 | Ishikawa | 348/373 |

FOREIGN PATENT DOCUMENTS

EP    0 969 352 A2 *  6/1999

* cited by examiner

*Primary Examiner*—Ramon O. Ramirez
*Assistant Examiner*—Gwendolyn Baxter
(74) *Attorney, Agent, or Firm*—Baniak Pine & Gannon

(57) ABSTRACT

A clip apparatus for a laptop computer includes a base member having a first end portion, a body portion, and a second end portion. The first end portion includes a flange portion for contacting a frame of a computer screen. The body portion includes an opening formed therein for receiving a locking pin. The second end portion includes an opening formed therein for receiving a mounting post. A securing arm is rotatably attached to the base to allow the securing arm to contact the frame of the computer screen and secure the base member to the frame of the computer screen.

23 Claims, 2 Drawing Sheets

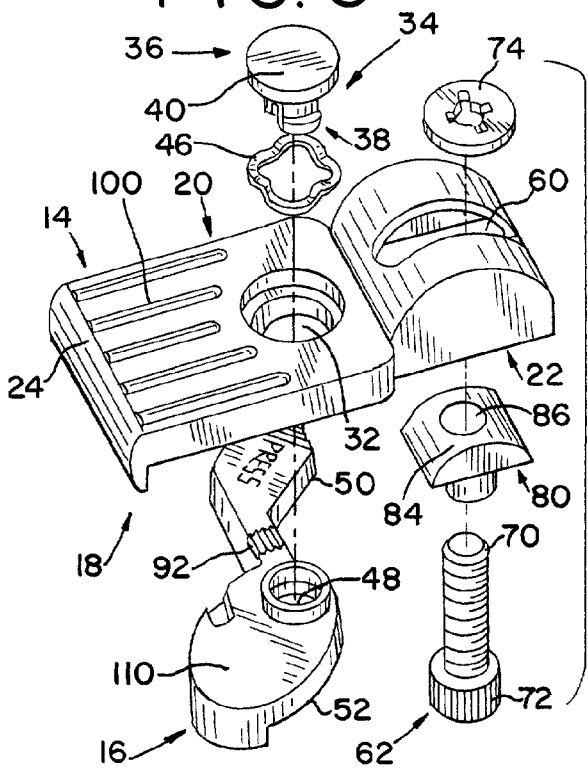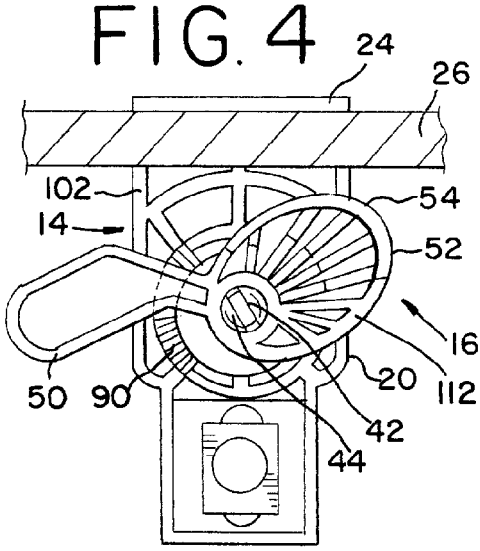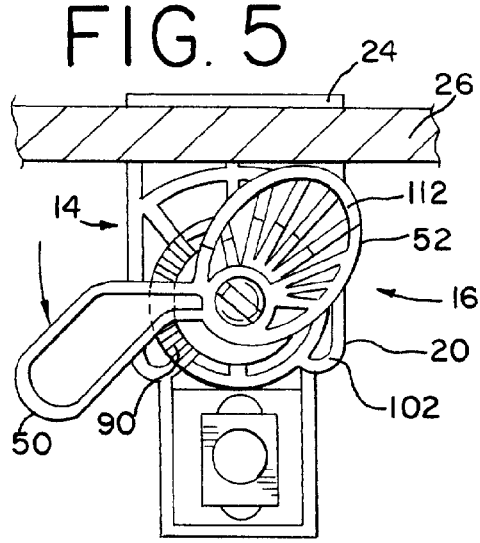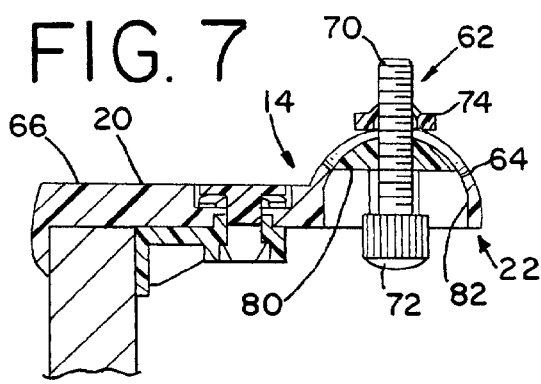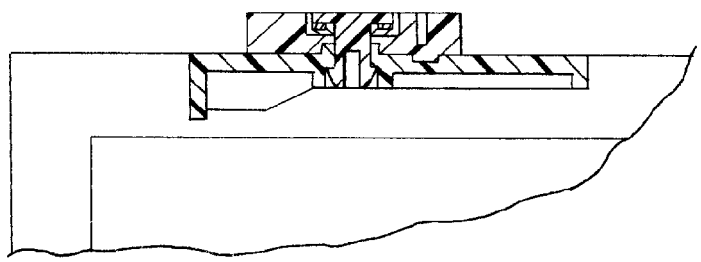

CLIP APPARATUS FOR A LAPTOP COMPUTER

FIELD OF THE INVENTION

This invention relates generally to the field of mechanical fasteners and in particular, to a clip apparatus for a laptop computer screen.

BACKGROUND OF THE INVENTION

Portable personal computers commonly referred to as laptop computers typically include a base portion having a conventional keypad and a hinged computer screen that can be rotated from a stowed position to an open position and vice versa. A thin rigid outer frame typically surrounds the computer screen.

In certain applications, certain electronic equipment such as, for example, a video camera, is used in conjunction with the laptop computer. As a result, it may be desirable to provide a mechanism that allows a user to secure these types of peripheral electronic equipment to the laptop computer. Attempts have been made to provide such a mechanism. For example, mechanical clips have been used, which allow a video camera to be indirectly secured to the frame of the hinged computer screen. Adhesives have typically been used to secure the mechanical clip to the frame. In order to provide a secure connection of the clip to the frame, the clip is typically permanently secured to the frame with these conventional adhesives. The disadvantage of this arrangement is that the clip is difficult to remove. This is a major drawback because the clip typically must be removed before the computer screen can be rotated from the open position to the stowed position when the computer is not in use. Moreover, the removal of the clip typically damages the bonding properties of the adhesive thereby rendering the adhesive useless for reattachment of the clip.

Accordingly, it would be desirable to have a clip apparatus for a laptop computer that overcomes the disadvantages described above.

SUMMARY OF THE INVENTION

One aspect of the invention provides a clip apparatus for a laptop computer including a base member having a first end portion, a body portion, and a second end portion. The first end portion includes a flange portion for contacting a frame of a computer screen. The body portion includes an opening formed therein for receiving a locking pin. The second end portion includes an opening formed therein for receiving a mounting post. A securing arm is rotatably attached to the base member to allow the securing arm to contact the frame of the computer screen and secure the base member to the frame of the computer screen. The flange portion may preferably extend outward from the body portion substantially perpendicular from the body portion. The securing arm may preferably be attached to the body portion of the base member, and may preferably include a manually operable portion and a contact portion. The contact portion may preferably include a curved contact surface, and the opening in the second end portion of the base member may preferably be a slot. The second end portion of the base member may preferably include a curved outer surface that extends upward from a top surface of the body portion. The securing arm may preferably be rotatable between an unlocked position and a locked position and vice versa. The body portion may preferably include a first set of locking teeth and the securing arm may preferably include a second set of locking teeth wherein the first set of locking teeth engages the second set of locking teeth to prevent rotational movement of the securing arm from the locked. position to the unlocked position. The body portion may preferably include a top side and a bottom side, and the first set of locking teeth may be positioned along the bottom side of the body portion. The first set of locking teeth may preferably be oriented along an arcuate path. The securing arm may also include a top side and a bottom side, and the second set of locking teeth may be positioned along the top side of the securing arm. The second set of locking teeth may be oriented along an arcuate path. The securing arm may preferably include an opening formed therein for receiving the locking pin. locking pin may preferably extend through the opening in the body portion of the base member and the opening in the securing arm to secure the securing arm against the base. A spring may preferably be positioned in the opening in the body portion, and the locking pin may preferably contact the spring. The mounting post may preferably include a first end and a second end. The first end of the mounting post may preferably extend through the opening in the second end portion. A retaining ring may preferably be positioned over the first end of the mounting post to retain the mounting post. Finally, a spacer may preferably be positioned against an inner surface of the second end portion of the base member. The spacer may preferably include an opening formed therein, and the mounting post may preferably extend through the opening in the spacer.

Another aspect of the invention provides a method of attaching a clip apparatus to a frame of a laptop computer screen. A base member including a first end portion, a body portion, and a second end portion is provided. The first end portion includes a flange portion, and the body portion includes an opening formed therein for receiving a locking pin. The second end portion includes an opening formed therein for receiving a mounting post. A securing arm is rotatably attached to the base. The securing arm is positioned in an unlocked position. The flange portion is contacted against the frame of the laptop computer screen. The securing arm is rotated from the unlocked position to a locked position. The securing arm is contacted against the frame of the laptop computer screen. A force is applied to frame of the laptop computer screen, and the base member is secured to the frame of the laptop computer screen. The body portion may preferably include a first set of locking teeth and the securing arm may preferably include a second set of locking teeth. The first set of locking teeth may preferably be engaged with the second set of locking teeth thereby preventing rotational movement of the securing arm from the locked position to the unlocked position. The securing arm may preferably include a manually operable portion and a contact portion. The manually operable portion may preferably be depressed, and the first set of locking teeth may preferably be disengaged from the second set of locking teeth. The securing arm may preferably be rotated from the locked position to the unlocked position. The base member may preferably be removed from the frame of the laptop computer screen.

Another aspect of the invention provides a clip apparatus for a laptop computer including a base member having a first end portion, a body portion, and a second end portion. The first end portion includes a flange portion for contacting a frame of a computer screen. The body portion includes an opening formed therein for receiving a locking pin. The second end portion includes an opening formed therein for receiving a mounting post. A securing arm is rotatably attached to the base to allow the securing arm to be positioned in a locked position to secure the base member to the frame of the computer screen. The body portion includes a first set of locking teeth and the securing arm includes a second set of locking teeth. The first set of locking teeth and the second set of locking teeth are oriented to lock the securing arm into the locked position.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 3 is an exploded perspective view of the clip apparatus shown in FIGS. 1 and FIG. 2;

FIG. 4 is a bottom view of the clip apparatus of FIG. 1 showing the securing arm in unlocked position;

FIG. 5 is a bottom view of the clip apparatus of FIG. 1 showing the securing arm e locked position;

FIG. 6 is a sectional view taken along lines 6—6 of FIG. 1; and

FIG. 7 sectional view taken along lines 7—7 of FIG. 1.

DETAILED DESCRIPTION OF THE PRESENTLY PREFERRED EMBODIMENTS

Figure 1:
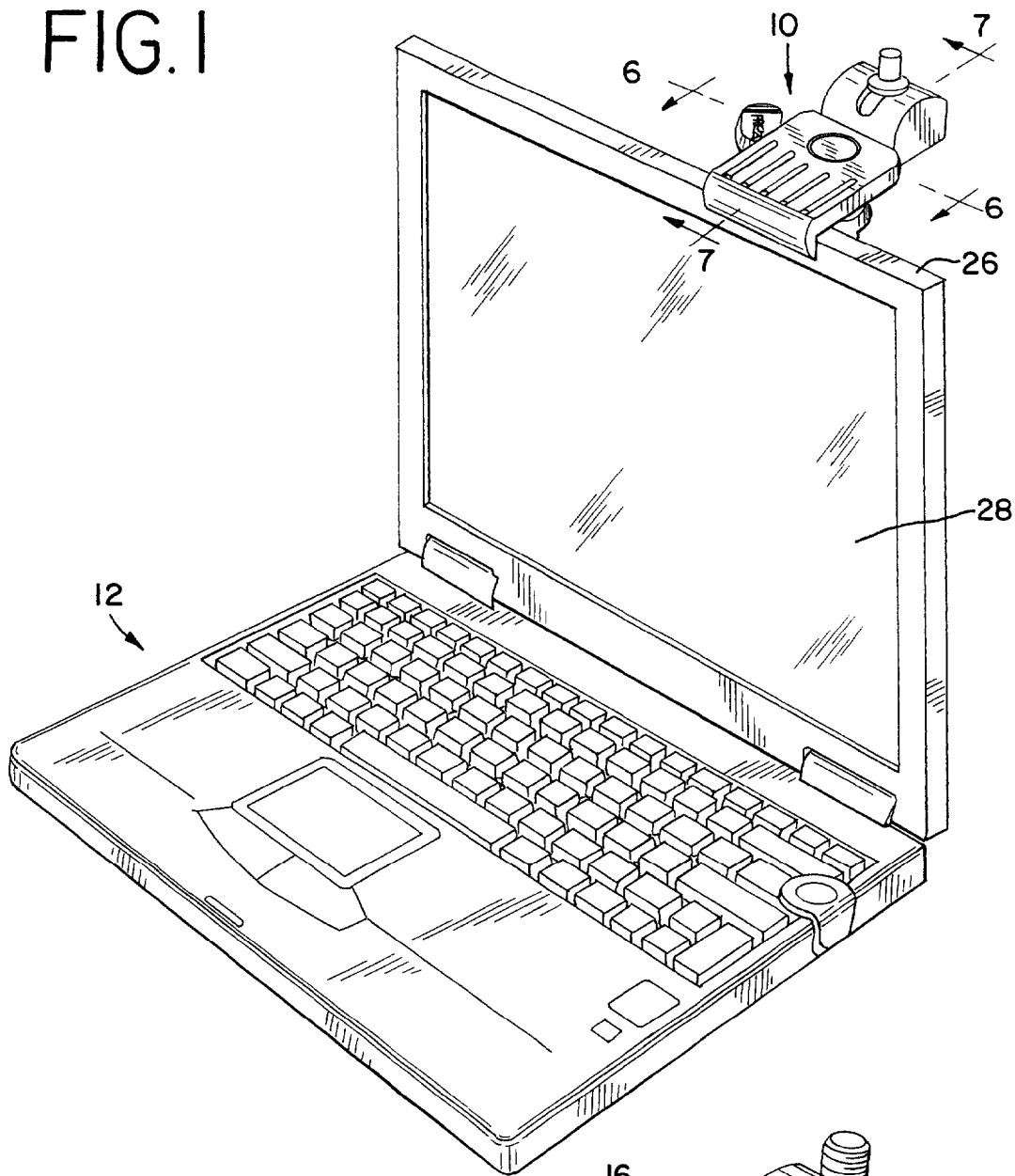
FIG. 1 is a perspective view of a preferred embodiment of a clip apparatus that is made in accordance with the invention, wherein the clip apparatus is shown attached to a frame of a computer screen of a laptop computer.
Figure 2:
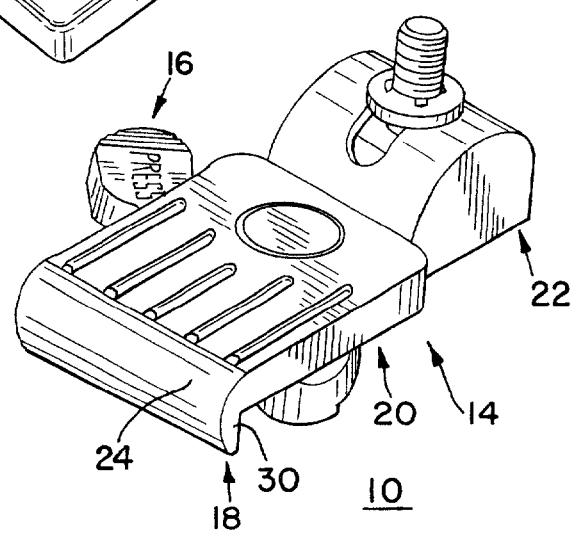
FIG. 2 is a perspective view of the of the clip apparatus of FIG. 1.

Referring to FIGS. 1 and 2, a preferred embodiment of a clip apparatus 10 for a laptop computer 12 includes a base member 14 and a securing arm 16 rotatably attached to the base member 14. Referring to FIGS. 2 and 3, the base member 14 includes a first end portion 18, a body portion 20, and a second end portion 22. The base member 14 provides a platform to which a peripheral electronic device such as, for example, a video camera (not shown), may be mounted. The first end portion 18 includes a flange portion 24 for contacting a frame 26 (see FIG.1) of a computer screen 28 (see FIG. 1). The flange portion 24 may preferably extend outward from the body portion 20 substantially perpendicular from the body portion 20. Referring to FIG. 2, a first compressible member (not shown) may preferably be positioned along an inside surface 30 of the flange portion 24. The first compressible member may preferably be comprised of rubber.

As shown in FIGS. 2–3, the body portion 20 is a generally planar member, although other shapes and configurations are contemplated. The base member 14 may preferably be comprised of molded plastic such as, for example, polycarbonate ABS plastic, although it is contemplated that other materials may be used.

As shown in FIG. 3. the body portion 20 includes an opening 32 formed therein for receiving a locking pin 34. The locking pin 34 secures the securing arm 16 to the base member 14 and is configured to allow the securing arm 16 to rotate about the locking pin 34. In the embodiment shown, the locking pin 34 includes a first end 36 and a second end 38. The first end 36 of the locking pin 34 includes a head portion 40, and the second end of the locking pin includes a pair of deflectable locking tabs 42, 44 (see FIG. 4). When assembled, the locking tabs 42, 44 contact the securing arm 16 to secure the securing arm 16 to the base member 14 (see FIG.4). The locking pin 34 may preferably be comprised of any type of rigid material such, for example, plastic. It should be understood by those of ordinary skill in the art that other types of locking pins may be used without departing from the spirit of the invention.

Referring again to FIG. 3, a spring member 46 may also be provided. In the embodiment shown, the spring member 46 is a washer that is seated in the opening 32 of the body portion 20. The spring member 46 may preferably be, for example, any of the commercially available washers having spring properties such as a wave washer. When assembled, the locking pin 34 is in contact with the spring member 46. As will be more fully described below, the spring member 46 allows the securing arm 16 to be depressed in a downward direction away from the base member 14 to allow the securing arm 16 to be rotated from a locked position to an unlocked position.

As shown in FIG. 3, the securing arm 16 may also include an opening 48 formed therein for receiving the locking pin 34. In the embodiment shown, the locking pin 34 extends through the opening 48 in the body portion 20 of the base member 14 and the opening 48 in the securing arm 16 to secure the securing arm 16 against the base member 14. In particular, the locking pin 34 and spring member 46 act to bias the securing arm 16 against the base member 14.

As shown in FIGS. 4–5, the securing arm 16 is attached to the base member 14 to allow the securing arm 16 to contact the frame 26 of the computer screen 28 (shown in FIG. 1) thereby securing the base member 14 to the frame 26 of the computer screen 28. The securing arm 16 is rotatable between an unlocked position (see FIG. 4) and a locked position (see FIG. 5) and vice versa. As shown in FIGS. 3–5, the securing arm 16 may preferably be attached to the body portion 20 of the base member 14. As shown in FIGS. 4–5, the securing arm 16 may preferably include a manually operable portion 50 and a contact portion 52. The manually operable portion 50 allows a user to rotated the securing arm 16 from the unlocked position (FIG. 4) to the locked position (FIG. 5) and vice versa. The manually operable portion 50 can also be depressed by the user to allow the securing arm 16 to be rotated from the locked position (FIG. 5) to the unlocked position (FIG. 4), as discussed more fully below.

As shown in FIG. 5, the contact portion 52 of the securing arm 16 contacts the frame 26 of the computer screen 28 (FIG. 1). As shown in FIG. 4, the contact portion 52 may preferably include a curved contact surface 54. The curved contact surface 54 allows the securing arm 16 to adjust to various sizes of frames, and allows the user to apply a gradual pressure to the frame 26 of the computer screen 28 (FIG. 1) for a snug and secure connection. A second compressible member (not shown) may preferably be positioned along the contact portion 52 of the securing arm 16. The second compressible member may preferably be comprised of rubber. The securing arm 16 may preferably be comprised of plastic such as, for example, polycarbonate ABS plastic, although other materials may be used.

Referring again to FIG. 3, the second end portion 22 of the base member 14 includes an opening 60 formed therein for receiving a mounting post 62. An electronic device such as, for example, a video camera (not shown) may then be mounted to the mounting post 62. The mounting post 62 may preferably be any conventional threaded screw such as, for example, a thumbscrew. The opening 60 in the second end portion 22 of the base member 14 may preferably be a slot. The slot 60 allows the mounting post 62 and the associated video camera to be manipulated into various positions along the second end portion 22 of the base member 14. As shown in FIG. 7, the second end portion 22 of the base member 14 may preferably include a curved outer surface 64 that extends upward from a top surface 66 of the body portion 20.

Referring again to FIGS. 3 and 7, the mounting post 62 may preferably include a first end 70 and a second end 72. The first end 70 of the mounting post 62 extends through the opening 60 in the second end portion 22. A retaining ring 74 may preferably be positioned over the first end 70 of the mounting post 62 to retain the mounting post 62. The retaining ring 74 ensures that the mounting post 62 remains positioned through the opening 60 in the second end portion 22. The retaining ring 74 may preferably be comprised of any insulative material.

Referring to FIGS. 3 and 7, a spacer 80 may preferably be positioned against an inner surface 82 (FIG.7) of the second end portion 22 of the base member 14. The spacer 80 may preferably include a head portion 84 that mirrors the shape of the curved inner surface 82 of the second end portion 22 to allow the spacer 80 to be manipulated into various positions along the second end portion 22 of the base member 14. The spacer 80 may preferably be comprised of plastic, although other materials are contemplated. As shown in FIG. 3, the mounting post 62 extends through an opening 86 in the spacer 80.

Referring again to FIGS. 4–5, the body portion 20 of the base member 14 includes a first set of locking teeth 90. Similarly, the securing arm 16 includes a second set of locking teeth 92 as shown in FIG. 3. The first set of locking teeth 90 and the second set of locking teeth 92 are oriented such that when the first set of locking teeth 90 engages the second set of locking teeth 92, they only permit the rotational movement in one direction. That is, they allow the securing arm 16 to move from the unlocked position (FIG. 4) to the locked position (FIG. 5), but prevent rotational movement of the securing arm 16 from the locked position (FIG. 5) to the unlocked position (FIG. 4). As a result, in order to rotate the securing arm 16 from the locked position (FIG. 5) to the unlocked position (FIG. 4), the manually operable portion 50. of the securing arm 16 must be depressed downward in a direction away from the base member 14, which disengages the first set of locking teeth 90 from the second set of locking teeth 92.

As shown in FIGS. 3–5, the body portion 20 of the base member 14 includes a top side 100 and a bottom side 102. As shown in FIGS. 4–5, the first set of locking teeth 90 are positioned along the bottom side 102 of the body portion 20. The first set of locking teeth 90 is oriented along an arcuate path. As shown in FIGS. 3–5, the securing arm 16 may also include a top side 110 and a bottom side 112. As shown in FIG. 3, the second set of locking teeth 92 is positioned along the top side 110 of the securing arm 16. The second set of locking teeth 92 is also oriented along an arcuate path.

Referring top FIGS. 1–7, in order to secure the clip apparatus 10 to the frame 26 of the laptop computer 12, the securing arm 16 is positioned in the unlocked position as shown in FIG. 4. The flange portion 24 is contacted against the frame 26 of the laptop computer screen 28. The securing arm 16 is then rotated from the unlocked position (FIG. 4) to a locked position (FIG. 5). As a result, the securing arm 16 and in particular, the contact portion 52, contacts against the frame 26 of the laptop computer screen 28. The movement of the securing arm 16 in the direction of the locked position results in a force being applied to the frame 26 of the laptop computer screen 28. The frame 26 is therefore pinched between the flange portion 26 of the base member 14 and the securing arm 16. The base member 14 is thereby secured to the frame 26 of the laptop computer screen 28. The advantage of this arrangement is that the base member 14 can be easily and quickly secured to the frame 26 of the computer screen 28 without the need for any adhesives.

When the securing arm 16 is in the locked position (FIG. 5), the first set of locking teeth 90 is engaged with the second set of locking teeth 92. As a result, when the securing arm 16 is in the locked position (FIG. 5), the first and second sets of locking teeth 90, 92 prevent the rotational movement of the securing arm 16 from the locked position (FIG. 5) to the unlocked position (FIG. 4). In other words, the securing arm 16 cannot move from the locked position (FIG. 5) to the unlocked position (FIG. 4).

To remove the clip apparatus 10 from the frame 26 of the laptop computer 12, a user may depress the manually operable portion 50 of the securing arm 16 in a downward direction causing the manually operable portion 50 to move in a direction away from the base member 14. The movement of the manually operable portion 50 in a direction away from the base member 14 results in the disengagement of the first set of locking teeth 90 from the second set of locking teeth 92. The securing arm 16 can then be manually rotated from the locked position (FIG. 5) to the unlocked position (FIG. 4). The base member 14 can then be removed from the frame 26 of the laptop computer screen 28. Another advantage of the clip apparatus 10 is that it can be attached to the frame 26 of the computer 12 and removed from the frame 26 an unlimited number of times as opposed to adhesives, which typically can be used only one time.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A clip apparatus for a portable computer comprising: a base member including a first end portion, a body portion, and a second end portion, the first end portion including a flange portion for contacting a frame of a computer screen of the portable computer, the body portion including an opening formed therein for receiving a locking pin, the second end portion including an opening formed therein for receiving a mounting post, a securing arm rotatably attached to the base member to allow the securing arm to contact the frame of the computer screen and secure the base member to the frame of the computer screen wherein the body portion includes a first set of locking teeth and the securing arm includes a second set of locking teeth wherein the first set of locking teeth engages the second set of locking teeth to prevent rotational movement of the securing arm from a locked position to an unlocked position.

2. The clip apparatus of claim 1 wherein the flange portion extends outward from the body portion substantially perpendicular from the body portion.

3. The clip apparatus of claim 1 wherein the securing arm is attached to the body portion of the base member.

4. The clip apparatus of claim 1 wherein the securing arm includes a manually operable portion and a contact portion.

5. The clip apparatus of claim 4 wherein the contact portion includes a curved contact surface.

6. The clip apparatus of claim 1 wherein the opening in the second end portion of the base member is a slot.

7. The clip apparatus of claim 1 wherein the second end portion of the base member includes a curved outer surface that extends upward from a top surface of the body portion.

8. The clip apparatus of claim 1 wherein the securing arm is rotatable between an unlocked position and a locked position and vice versa.

9. The clip apparatus of claim 1 wherein the body portion includes a top side and a bottom side, the first set of locking teeth positioned along the bottom side of the body portion.

10. The clip apparatus of claim 9 wherein the first set of locking teeth is oriented along an arcuate path.

11. The clip apparatus of claim 1 wherein the securing arm includes a top side and a bottom side, the second set of locking teeth positioned along the top side of the securing arm.

12. The clip apparatus of claim 11 wherein the second set of locking teeth is oriented along an arcuate path.

13. The clip apparatus of claim 1 wherein securing arm includes an opening formed therein for receiving the locking pin.

14. The clip apparatus of claim 13 wherein the locking pin extends through the opening in the body portion of the base member and the opening in the securing arm to secure the securing arm against the base.

15. The clip apparatus of claim 14 further comprising a spring, the spring positioned in the opening in the body portion, the locking pin contacting the spring.

16. The clip apparatus of claim 1 wherein the mounting post includes a first end and a second end, the first end of the mounting post extending through the opening in the second end portion.

17. The clip apparatus of claim 16 further comprising a retaining ring, the retaining ring positioned over the first end of the mounting post to retain the mounting post.

18. The clip apparatus of claim 1 further comprising a spacer positioned against an inner surface of the second end portion of the base member, the spacer including an opening formed therein, the mounting post extending through the opening in the spacer.

19. A method of attaching a clip apparatus to a frame of a portable computer screen comprising:

providing a base member including a first end portion, a body portion, and a second end portion, the first end portion including a flange portion, the body portion including an opening formed therein for receiving a locking pin, the second end portion including an opening formed therein for receiving a mounting post, a securing arm rotatably attached to the base;

positioning the securing arm in an unlocked position;

contacting the flange portion against the frame of the portable computer screen;

rotating the securing arm from the unlocked position to a locked position;

contacting the securing arm against the frame of the portable computer screen;

applying a force to the frame of the portable computer screen; and securing the base member to the frame of the portable computer screen.

20. The method of claim 19 wherein the body portion includes a first set of locking teeth and the securing arm includes a second set of locking teeth and further comprising;

engaging the first set of locking teeth with the second set of locking teeth; and preventing rotational movement of the securing arm from the locked position to the unlocked position.

21. The method of claim 20 wherein the securing arm includes a manually operable portion and a contact portion and further comprising:

depressing the manually operable portion;

disengaging the first set of locking teeth from the second set of locking teeth, and rotating the securing arm from the locked position to the unlocked position.

22. The method of claim 21 further comprising:

removing the base member from the frame of the portable computer screen.

23. A clip apparatus for a portable computer comprising:

a base member including a first end portion, a body portion, and a second end portion, the first end portion including a flange portion for contacting a frame of a computer screen of the portable computer, the body portion including an opening formed therein for receiving a locking pin, the second end portion including!an opening formed therein for receiving a mounting post, a securing arm rotatably attached to the base to allow the securing arm to be positioned in a locked position to secure the base member to the frame of the computer screen wherein the body portion includes a first set of locking teeth and the securing arm includes a second set of locking teeth, the first set of locking teeth and the second set of locking teeth oriented to lock the securing arm into the locked position.

* * * * *